United States Patent [19]
Barrett

[11] Patent Number: 6,152,462
[45] Date of Patent: Nov. 28, 2000

[54] CONVERTIBLE HAND CART SYSTEM

[76] Inventor: Paul D. Barrett, 1616 Rachel La., Lakeland, Fla. 33805-8521

[21] Appl. No.: 09/375,725

[22] Filed: Aug. 17, 1999

[51] Int. Cl.<sup>7</sup> ........................................................ B62B 3/02
[52] U.S. Cl. ............................ 280/30; 280/640; 280/641; 280/652; 280/47.24
[58] Field of Search ............................... 280/30, 638, 639, 280/640, 38, 641, 651, 652, 655, 659, 47.18, 47.24

[56] References Cited

U.S. PATENT DOCUMENTS

| | | | |
|---|---|---|---|
| 2,596,986 | 5/1952 | Curtiz | 280/30 |
| 3,104,889 | 9/1963 | Branch, Jr. | 280/30 |
| 3,997,213 | 12/1976 | Smith et al. | 280/30 |
| 4,190,280 | 2/1980 | Donohoe | 280/640 |
| 4,253,546 | 3/1981 | Uchida | 280/30 |
| 4,258,826 | 3/1981 | Murray | 280/30 |
| 5,499,831 | 3/1996 | Worth et al. | 280/30 |

FOREIGN PATENT DOCUMENTS

| | | | |
|---|---|---|---|
| 217019 | 6/1924 | United Kingdom | 280/30 |
| 2231537 | 11/1990 | United Kingdom | 280/30 |

*Primary Examiner*—Richard M. Camby

[57] ABSTRACT

Disclosed is a convertible hand cart for use in storing and transporting equipment. The hand cart ideally employs three independently pivotal linkages. The linkages enable the cart to take in any one of five configurations: a folded orientation; a loading configuration; a hand cart configuration; an inclined table configuration; and an erect table configuration. These configurations allow a user to easily load, transport and utilize equipment upon the table. Also disclosed are the various table top configurations the system can employ.

8 Claims, 7 Drawing Sheets

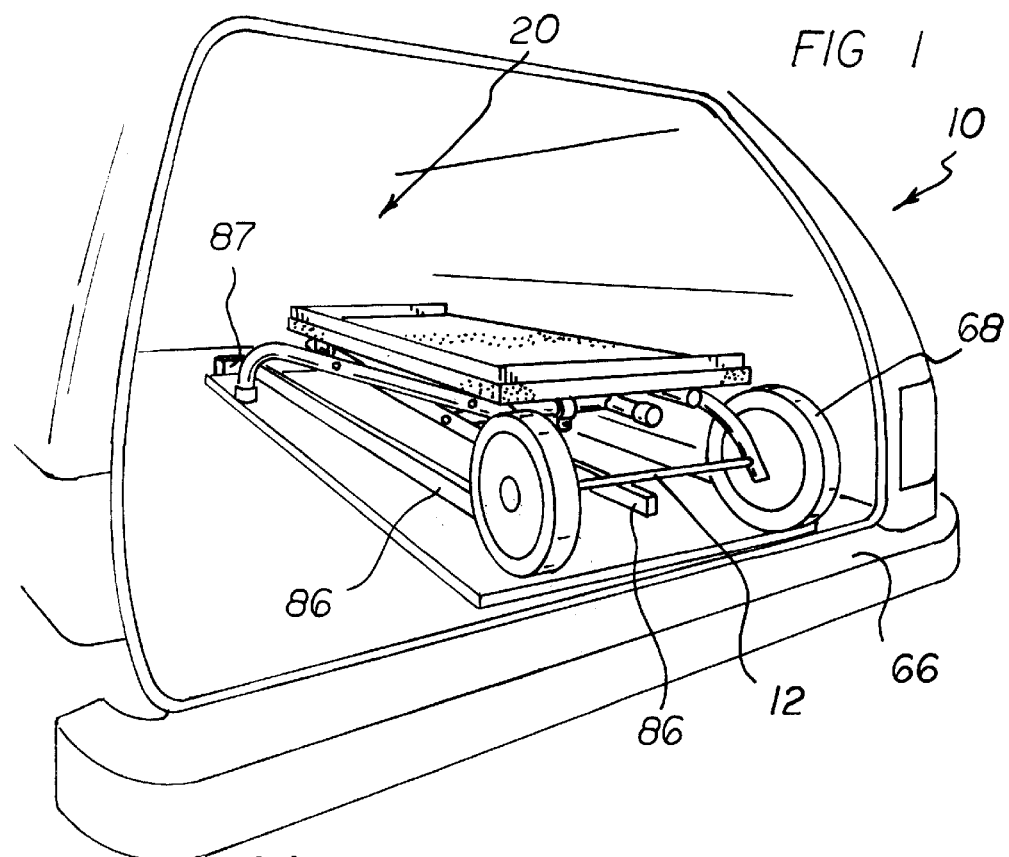
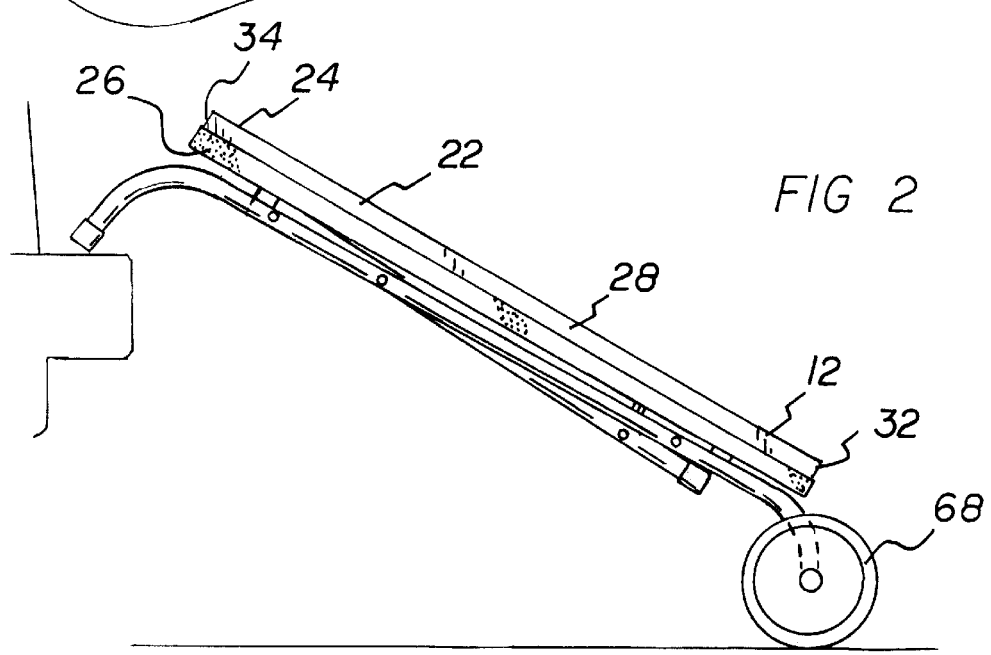

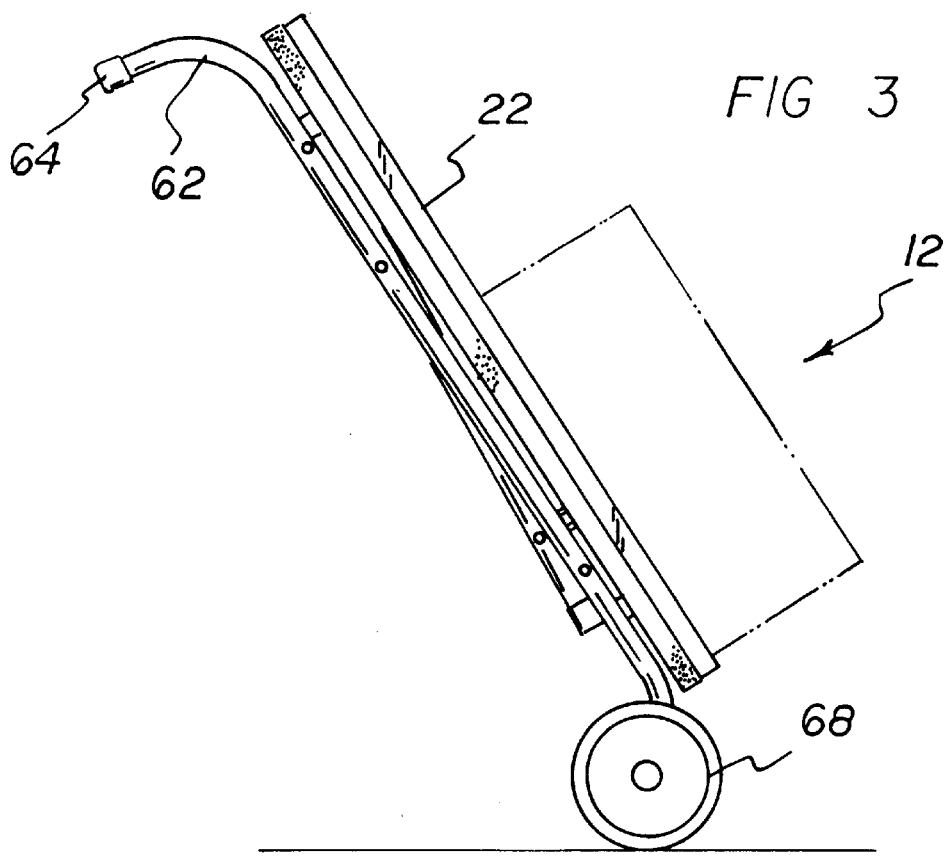
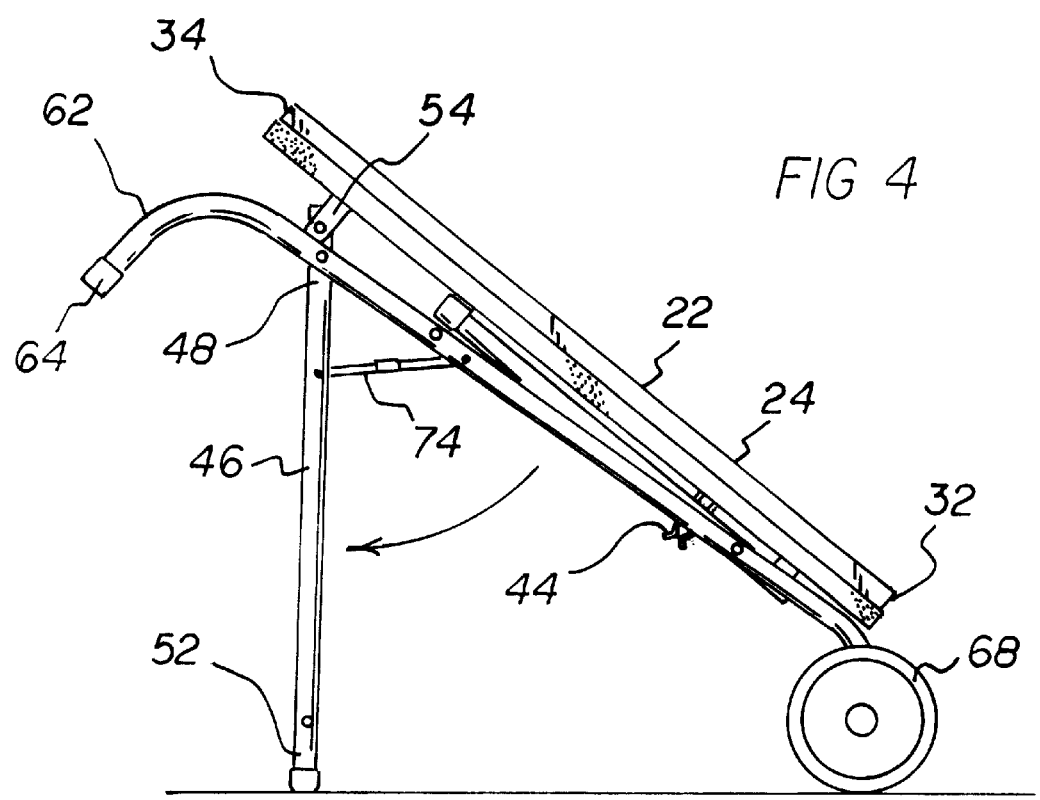

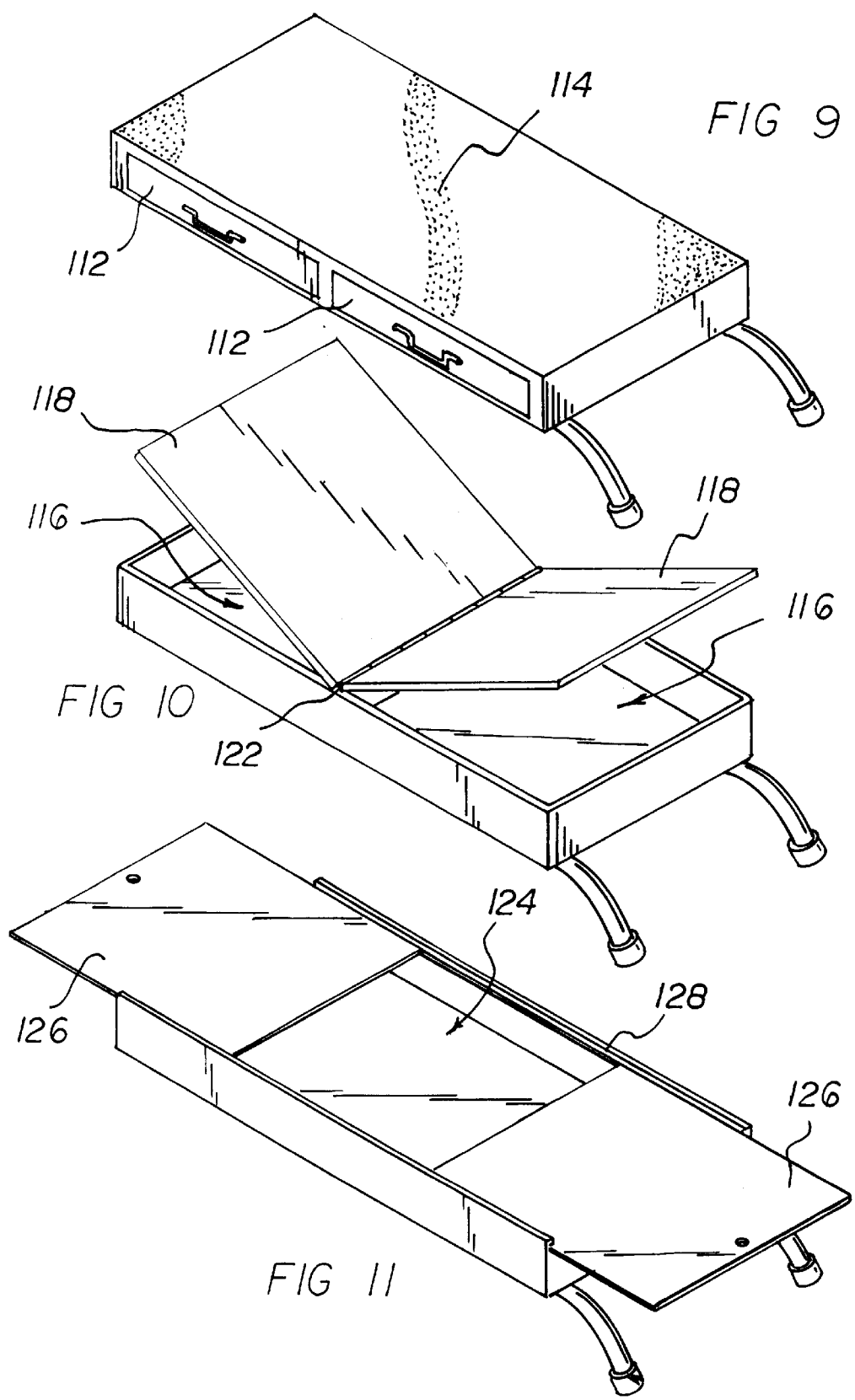

CONVERTIBLE HAND CART SYSTEM

BACKGROUND OF THE INVENTION

1. Field of the Invention

The present invention relates to a convertible hand cart system, and more particularly pertains to a hand cart which can achieve multiple configurations and which can be stored within a vehicle compartment.

2. Description of Related Art

The use of convertible hand carts is known in the art. Typically, such carts employ a work surface to which one or more linkages is secured. Often times one of the linkages is pivotal such that the cart can achieve a different configuration.

A prime example of such a cart is U.S. Pat. No. 3,873,118 to Takagi which discloses a manual carrier employing a pivotal u-shaped arm. The carrier is convertible from an inclined position to a horizontal position and vice verse.

Furthermore, U.S. Pat. No. 5,669,659 to Dittmer discloses a combination chair and hand truck which employs a pair of load support members and a pair of leg members.

U.S. Pat. No. 5,145,441 to White et al. discloses a folding and rolling two surface table. The table has two positions—folded and unfolded.

Additionally, U.S. Pat. No. 4,565,382 to Sherman discloses a combined portable table and hand truck. The device includes a pair of hingedly connected U-shaped members.

U.S. Pat. No. 4,136,889 to Middleton discloses a collapsible trolley which employs pivotal support arms.

Lastly, U.S. Pat. No. 3,785,669 to Doheny discloses a convertible bulk hand truck which includes a foldable adjustable linkage.

None of these patents, however, discloses or suggests a handcart which can achieve five different orientations through the use of three pairs of linkages.

Therefore, it can be appreciated that there exists a continuing need for new and improved handcart configurations which can be achieved with minimal moving parts. In this regard, the present invention substantially fulfills this need.

BRIEF SUMMARY OF THE INVENTION

The general purpose of the present invention is to provide a hand cart which can be oriented into a great many configurations.

To attain this, the present invention essentially comprises a convertible hand cart including a table having an upper surface, a lower surface and a peripheral edge therebetween, as well as a forward portion and a rearward portion. A pair of primary linkages are included and have a first end pivotally coupled to the rearward lower surface of the table. A pair of transverse linkages are included and have a rearward handle extent and a forward extent. A pair of wheels are rotatably mounted to the forward extent. The pair of transverse linkages are pivotally interconnected proximate the first end of the pair of primary linkages. The cart also includes a pair of free linkages which have a first end pivotally coupled to an intermediate extent of the pair of transverse linkages, and a second end. The pair of free linkages have a first folded orientation wherein the linkages are in alignment with the primary and transverse linkages and the table, and a second erect orientation wherein the pair of primary linkages are inclined relative to the table, and wherein the second end is in frictional engagement with the forward lower surface of the table.

It is therefore an object of the present invention to provide a convertible hand cart which has multiple configurations, yet employs minimal moving parts.

It is another object of the present invention to provide a hand cart which when folded can be slidably positioned upon a base within the storage compartment of a vehicle.

It is a further object of the present invention to provide a convertible hand cart with an internal compartment for the storage of various articles.

An even further object of the present invention is to provide a convertible hand cart which employs three independently pivotal linkages.

Even still another object of the present invention is to provide a convertible hand cart which employs a pair of free linkages—namely, linkages which are pivotally secured at only one point.

Lastly, it is an object of the present invention to provide a convertible hand cart system which is adapted to be positioned within the rear compartment of a vehicle. The system comprises a table having an upper surface, a lower surface and a peripheral edge therebetween, a forward portion and a rearward portion. A stop is secured to the forward lower surface of the table. Padding covers the entire table. Three raised edges are positioned about the peripheral edge. A c-clamp is included which has an upper portion secured to the lower forward potion of the table and a lower opened portion. A pair of primary linkages are included which employ a first end pivotally coupled to the rearward lower surface of the table, and a second end in between which a transverse rod is secured. The transverse rod is adapted to be removably coupled to the c-clamp when the primary linkage is in the folded orientation. The cart also includes a pair of transverse linkages. The linkages have a rearward curved handle extent and a forward extent. A pair of wheels are rotatably mounted to the forward extent. The pair of transverse linkages are pivotally interconnected proximate the first end of the pair of primary linkages. A pair of elbow linkages are interconnected between the first end of the pair of primary linkages and the rearward extent of the pair of transverse linkages. The elbow linkages have a first locked orientation wherein the pair of transverse and primary linkages are separated, and a second orientation wherein the linkages are permitted to pivot relative to one another. A pair of free linkages are included which have a first end pivotally coupled to an intermediate extent of the pair of transverse linkages, and a second end. The pair of free linkages have a first folded orientation wherein the linkages are in alignment with the primary and transverse linkages and the table; and a second erect orientation wherein the pair of free linkages are inclined relative to the table and the second end is in frictional engagement with the forward lower surface of the table and the stop. Thus, the table is in an upright configuration when the pair of elbow linkages are in the first locked orientation and the pair of free linkages are in the second erect orientation. Conversely, the table is in a collapsed folded configuration with the primary, transverse and free linkages folded upon the lower surface of the table. A base is positioned within the rear compartment of the vehicle. The base has an upper surface with twin rails supported thereon as well as a perpendicular abutment rail. The base is adapted to support the cart in the folded configuration with the twin rails positioned in between the handles and wheels.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a perspective view of the cart in the collapsed configuration.

FIG. 2 is a side elevational view of the loading/unloading configuration of the cart.

FIG. 3 is a side elevational view of the hand cart configuration.

FIG. 4 is a side elevational view of the cart in the inclined table configuration.

FIG. 9 is a view of the sliding drawer embodiment of the present invention.

FIG. 10 is a view of the pivotal table top embodiment of the present invention.

FIG. 11 is a view of the sliding table top embodiment of the present invention.

The same reference numerals refer to the same parts throughout the various Figures.

DETAILED DESCRIPTION OF THE INVENTION

The present invention relates to a convertible hand cart for use in storing and transporting equipment. The hand cart ideally employs three independently pivotal linkages. The linkages enable the cart to take any one of five configurations: a folded configuration; a loading configuration; a hand cart configuration; an inclined table configuration; and an erect table configuration. These configurations allow a user to easily load, transport and utilize equipment upon the table. The present invention also relates to the various table top configurations the system can employ. A more detailed description of the various features of the present invention is provided hereinafter.

Primary Embodiment

The convertible hand cart system 10 of the present invention is illustrated in FIG. 1. This Figure illustrates the cart 12 positioned within the rear compartment 20 of a vehicle.

Figure 5:
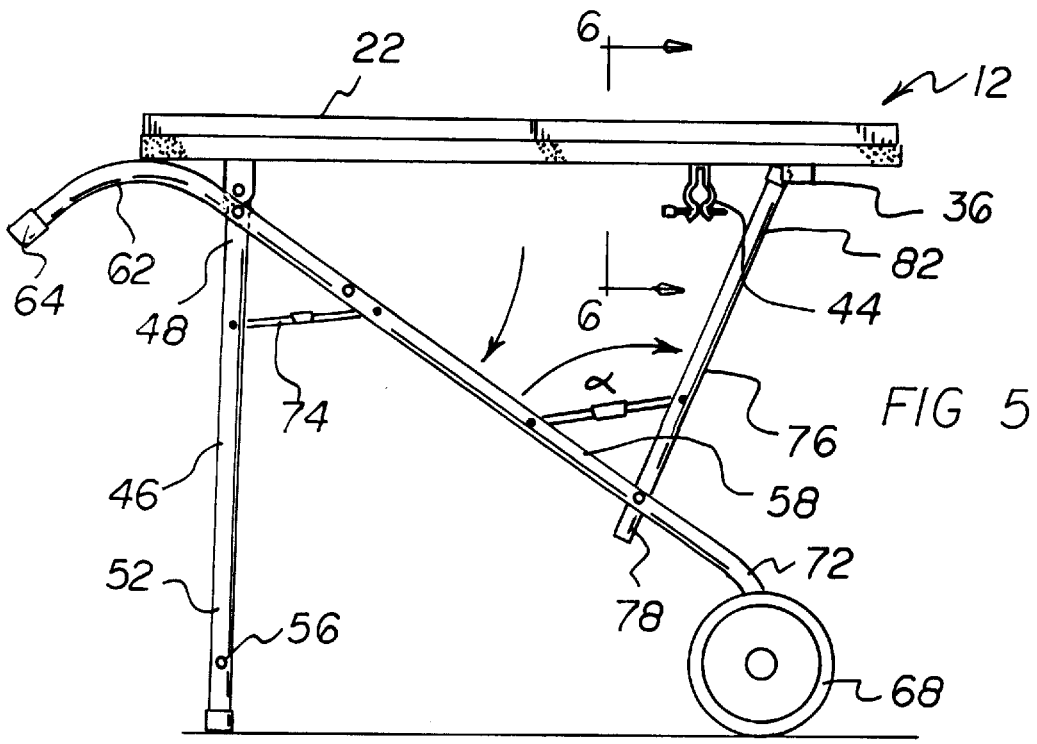
FIG. 5 is a side elevational view of the cart in the upright table configuration.
Figure 6:
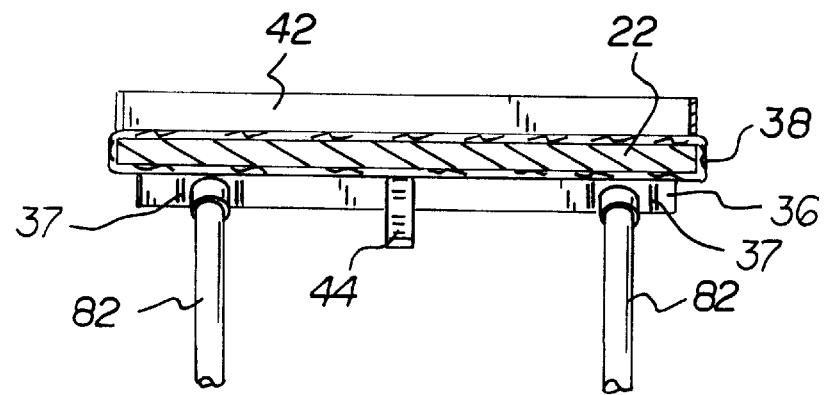
FIG. 6 is a sectional view taken along line 6—6 of FIG. 5.

The table 22 of the cart 12 is defined by an upper surface 24, a lower surface 26 and a peripheral edge 28 therebetween. The table 22 is further defined by forward and rearward portions, 32 and 34 respectively. FIG. 5 illustrates the stop 36 which is secured to the forward lower surface of the table 22. The function of the stop 36 will be described in greater detail hereinafter. In the preferred embodiment, padding 38 is utilized to cover the entire table 22. The padding 38 prevents equipment stored upon the table 22 from being marred, or otherwise damaged. Additionally, raised side edges 42 are employed in keeping equipment from falling off the edges 28. In the preferred embodiment, three such raised edges 42 are employed about the peripheral edge 28. Straps may also be utilized in retaining equipment upon the upper surface 24.

FIG. 5 illustrates the c-clamp 44 which is secured to the underside of the table 22. The clamp 44 ideally includes an upper portion secured to the lower forward portion of the table 22 and a lower opened portion. The function of the c-claim 44 will be explained more fully hereinafter.

The linkages of the cart will be described next. Specifically, three pairs of independently pivotal linkages are included: primary linkages; transverse linkages; and free linkages. Each of the linkage pairs has an erect and folded orientation. By pivoting select linkages, the cart 12 can achieve any one of five different configurations. These configurations will be described more fully hereinafter.

The pair of primary linkages 46 are defined by first and second ends, 48 and 52 respectively. The first end 48 is pivotally coupled to the rearward lower surface of the table 22. Specifically, an enlarged u-shaped joint 54, is secured to the underside of the table 22. Each individual linkage, of the linkage pair 46, is then pivotally interconnected to one side of the joint by way of a carriage bolt or the like. Additionally, the second end 52 of the pair has a transverse rod 56 secured in between its linkages. The transverse rod 56 is adapted to be removably coupled to the c-clamp 44 of the table 22. With the rod 56 positioned within the c-clamp 44, the pair of primary linkages 46 are in the folded orientation. Thus, the c-clamp functions in retaining the primary linkages 46. To aid in retaining the linkages 46, a pin can be included, note FIG. 5. Alternatively, the erect orientation is achieved when the primary linkages 46 are positioned perpendicular to the table surface 22.

The pair of transverse linkages 58 are defined by a rearward curved handle extent 62 and a forward extent 72. Each rearward end 62 is capped by way of an elastic cover 64. Through such covers, the handles 62 can rest upon the bumper 66 of vehicle without causing any damage. A pair of wheels 68 are rotatably mounted to the forward extent 72 of the transverse linkages 58 in a manner known in the art. Additionally, the rearward extent 62 of the pair of transverse linkages 58 is pivotally interconnected proximate the first end 48 of the pair of primary linkages 46. Specifically, as illustrated in FIG. 5, each transverse linkage is pivotally interconnected to an associated primary linkage just below the U-shaped joint 54. Thus, the pair of transverse linkages 58 has an erect orientation, as illustrated in FIG. 5, wherein the forward extent 72 is remote from the table 22. Conversely, the folded orientation, illustrated in FIG. 1, has the forward extent 72 facing the table 22.

With reference now to FIGS. 4 and 5, the pair of elbow linkages 74 are depicted. Additionally, FIG. 5 illustrates elbow linkages 75. Linkages 74 are interconnected between the first end 48 of the pair of primary linkages 46 and the rearward extent 62 of the pair of transverse linkages 58. Likewise, linkages 75 are interconnected between free linkages 76 and transverse linkages 58. The elbow linkages 74 have a first locked orientation, wherein the pair of transverse 58 and primary linkages 46 are separated; and a second orientation, wherein the pair of transverse linkages 58 and primary linkages 46 are permitted to pivot relative to one another. Likewise, linkages 75 have a first locked orientation, wherein the free linkages 76 and transverse linkages 58 are separated; and a second orientation, wherein the free linkages 76 and transverse linkages 58 are permitted to pivot relative to one another. Thus, the cart's folded orientation can not be achieved when the elbow linkages 74 and 75 are in their first orientations. Conversely, the folded orientation can only be achieved with the elbow linkages 74 and 75 in the second orientation. Finally, the inclined table orientation noted in FIG. 4 is permitted when linkages 74 are in the first orientation, and linkages 75 are in the second orientation.

The pair of free linkages 76 are most clearly illustrated with reference to FIG. 5. This Figure shows that the first end 78 of the pair 76 is pivotally coupled to an intermediate extent of the pair of transverse linkages 58. Such pivotal interconnection can be achieved by way of carriage bolts or the like. Furthermore, the pair of free linkages 76 includes a second free end 82. The pair of free linkages 76 thus have a first folded orientation, wherein the linkages are in alignment with the primary 46 and transverse linkages 58 and the table 22. Additionally, the linkages have a second orientation wherein the pair of free linkages 76 are inclined relative to the table 22. FIG. 5 illustrates the second orientation of the pair of free linkages 76. In this orientation, the second end 82 is in frictional engagement with the forward lower surface of the table 22 and the stop 36. Thus, the stop 36 functions in limiting the movement of the free linkages 76. In this regard the stop 36 includes two indented regions 37 for accepting the upper extents of the free linkages 76. Additionally, the free linkages 76 make an acute angle a relative to the transverse linkages 58. Thus, when the table is fully erect, neither the transverse 58, the free linkages 76, nor the primary linkages 46 are perpendicular to the table top 22. This arrangement provides for increased stability.

Thus, when the table 22 is in an upright configuration, the pair of elbow linkages 74 are in the first locked orientation and the pair of free linkages 76 are in the second erect orientation. Although a pair of elbow linkages are described, one elbow linkage can be employed on either side of the cart. Conversely, when the table 22 is in the collapsed, folded, configuration the primary 46, transverse 58 and free linkages 76 are folded upon, and in alignment with, the lower surface 26 of the table 22. However, other configurations are possible. An example of such is the configuration depicted in FIG. 4. Here, the elbow linkages 74 are in the first locked orientation, and the elbow linkages 75 are in the second orientation. Furthermore, the free linkages 76 are in the first collapsed configuration, lying upon the table surface 22. This configuration gives a triangular appearance to the cart 12. This inclined table configuration is a useful intermediate position between the fully collapsed configuration depicted in FIG. 1 and the hand cart configuration depicted in FIG. 3.

The base 84 employed in the system of the present invention will be described next. As illustrated in FIG. 1, the base 84 is positioned within the rear compartment 20 of the vehicle, such as a sport utility vehicle, or pick-up truck. The base 84 is defined by an upper surface with twin rails 86 supported thereon. Furthermore, as is illustrated in FIG. 1, the upper surface also supports an abutment rail 87 which is perpendicular to, and in contact with, the twin rails 86. A cart positioned upon the upper surface is restrained from sliding by way of the abutment rail. The base 84 is adapted to support the cart 12 in the folded configuration. Namely, when folded, the handle portion 62 and wheels 68 are positioned upon the base 84. In this configuration, the twin rails 86 of the base 84 are positioned in between the handles 62 and wheels 68 and act as guiding elements to ensure the proper location of the cart 12.

The various configurations attainable by the cart 12 will now be described in detail. The first configuration is achieved when all the linkages are folded into the table surface 22 and the cart 12 is positioned upon the base 84. This is the collapsed configuration and it is depicted in FIG. 1. FIG. 2 illustrates the loading/unloading configuration of the cart. The linkages remain collapsed, however, the handles 62 rest upon the rear bumper 66, or area, of the vehicle. The next configuration is achieved by tilting the cart 12 up from the loading/unloading configuration. This is the handcart configuration and is illustrated in FIG. 3. Yet, an additional embodiment is realized by pivoting the primary linkage pair 46 down and locking the elbow linkages 74, while maintaining the transverse 58 and free linkages 76 in their collapsed orientations. This is the inclined table configuration illustrated in FIG. 4. This configuration provides a convenient intermediate step between the loading configuration of FIG. 2 and the handcart configuration of FIG. 3. Finally, the erect table configuration is achieved by placing each of the linkages in their deployed, erect, configuration. The table configuration is illustrated in FIG. 5.

Additional Embodiments

Additional cart embodiments are described in conjunction with FIGS. 7–11, and 15–16. These Figures illustrate seven different table top embodiments: an architect's table; a compartmentalized table; a sliding drawer table; pivotal table tops; two different sliding table top embodiments; and a pivotal lid embodiment. Each of these table embodiments can be employed with the cart as previously described.

Figure 7:
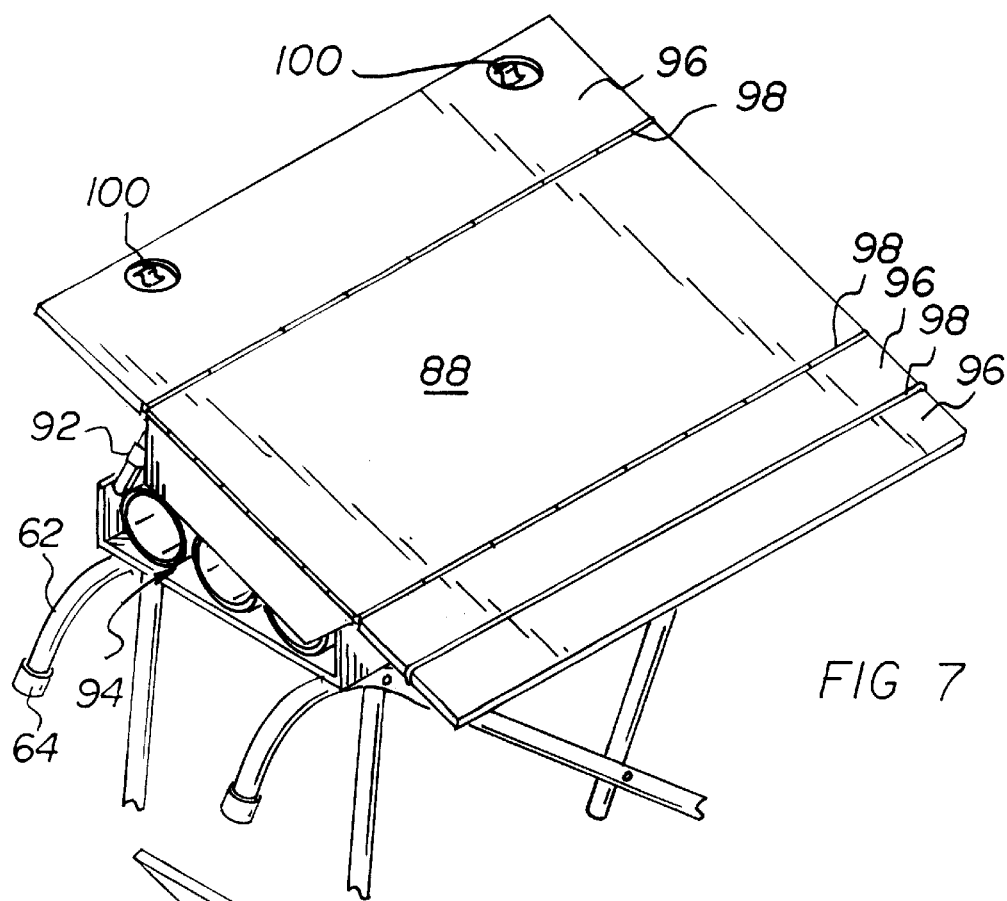
FIG. 7 is a view of the architect's table embodiment of the present invention.
Figure 8:
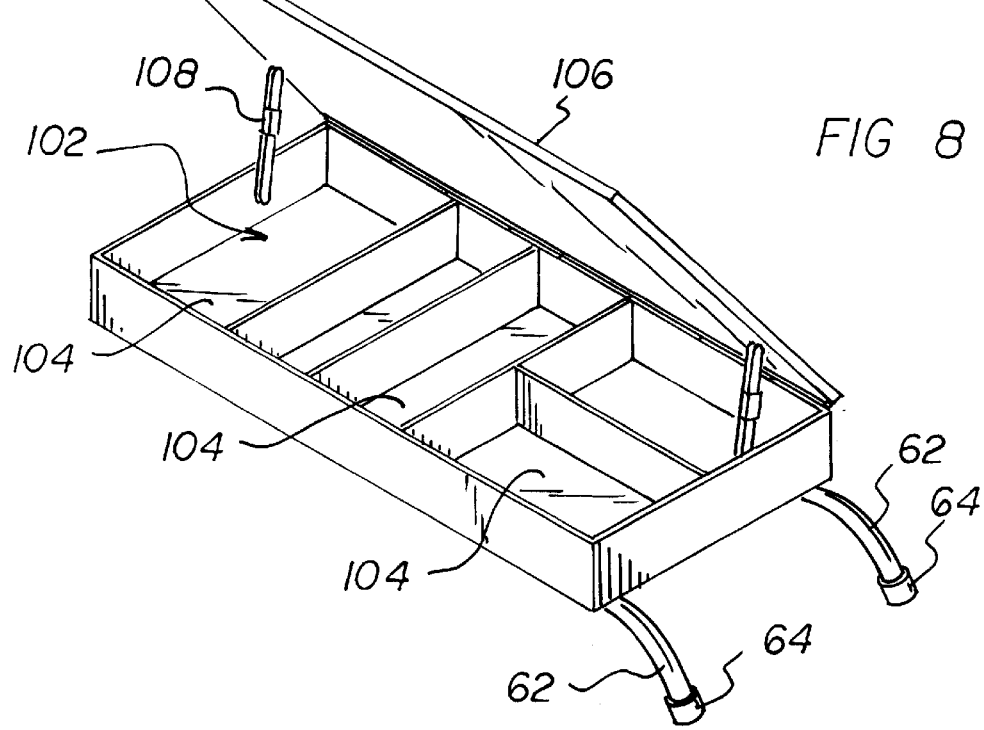
FIG. 8 is a view of the compartmented table embodiment of the present invention.

In each of the alternative embodiments, the table defines an internal compartment. In the architect's table embodiment, the upper surface 88 is pivotally interconnected to the lower surface by way of a pair of elbow linkages 92. Through the linkages, the top 88 can achieve a first orientation parallel to the lower table surface, and a second orientation inclined relative to the lower surface. The internal compartment 94 of the architect's embodiment can be employed in storing rolled blue prints and the like. To this end, tubular supports are included within the compartment. FIG. 7 illustrates the table top 88 inclined relative to the lower surface. With continuing reference to FIG. 7, the upper surface 88 has a series of extensions 96 which are pivotally interconnected to the main surface. The extensions 96 are preferably interconnected to the main surface by way of a piano-type hinge 98. Thus, the upper surface 88 has a first orientation wherein the extensions 96 are folded over on top of the upper surface 88. A second orientation is also included wherein the extensions 96 are folded outwardly of the main surface. FIG. 7 illustrates this second orientation, wherein the extensions 96 are outwardly of, and parallel to, the upper main surface 88. Upper recessed clips 100 can be employed upon an extension to support plans or blue prints. Furthermore, an elastic band 97 can be employed to retain the lower portion of any blue prints.

The compartmentalized table embodiment is described next. Here, the table defines an internal compartment 102 with a series of subcompartments 104 defined therein, note FIG. 8. Furthermore, the upper surface 106 is pivotally interconnected to the lower surface. Again, this pivotal interconnection is achieved by elbow linkages 108. The upper surface 106 has a first orientation parallel to the lower surface, and a second orientation inclined relative to the lower surface.

Figure 15:
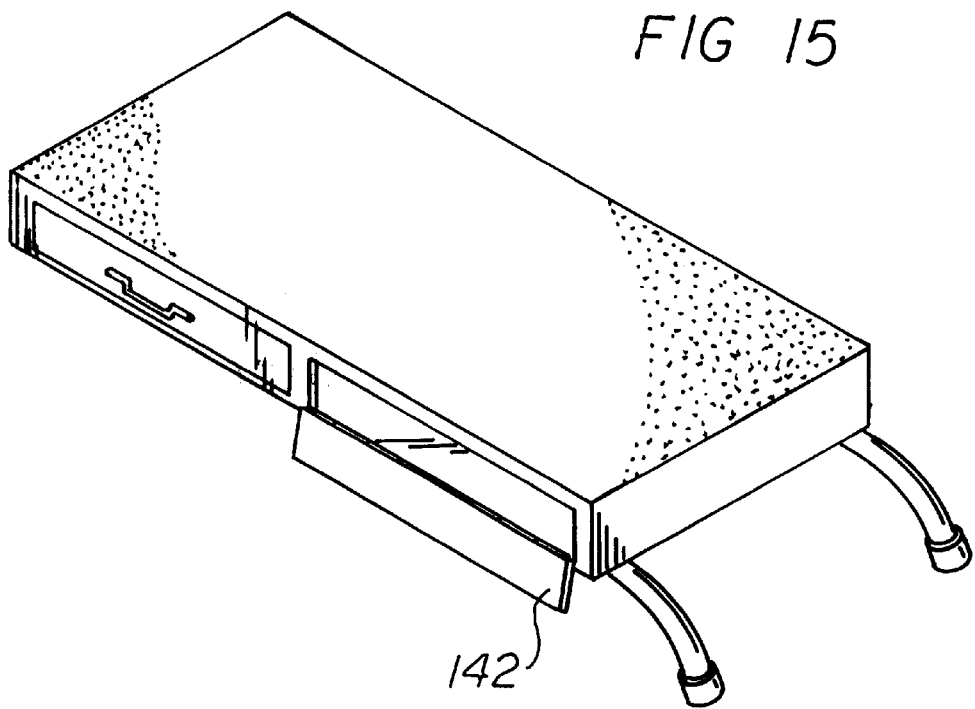
FIG. 15 is a view of a flip down lid embodiment of the present invention.

FIG. 9 illustrates the sliding drawer embodiment of the present invention. Here, the table defines an internal compartment into which two sliding drawers 112 are positioned. A user can thus store items within each of the drawers 112 and slide them into and out of the compartment as necessary. FIG. 9 also illustrates the table top with a textured surface 114. This surface 114 prevents objects from slipping. FIG. 15 illustrates a related embodiment wherein lids 142 pivot relative to the compartment. This embodiment avoids any weight instability within the cart.

FIG. 10 illustrates the pivotal surface embodiment. In this embodiment, the internal compartment 116 is selectively covered by two surfaces 118 which are pivotally interconnected along an intermediate extent. The intermediate hinge 122 can take the form of a piano-type hinge. Either surface 118 can be picked up to gain access to the internal compartment 116.

Figure 16:
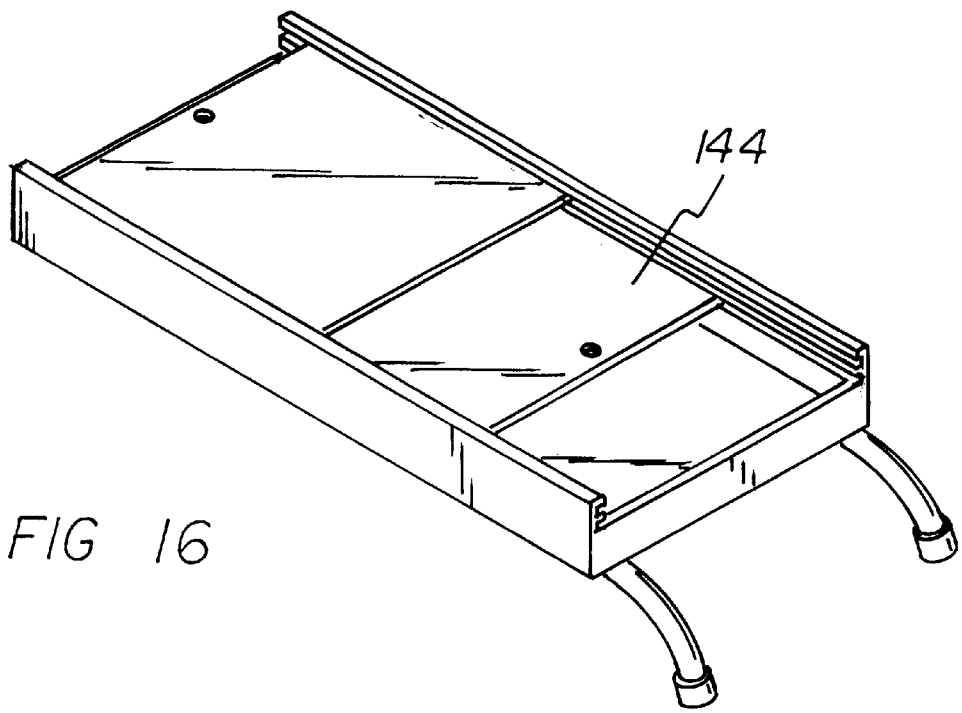
FIG. 16 is a view of a sliding table top embodiment, wherein the table tops are permitted to slide over one another.

Finally, FIG. 11 illustrates a table embodiment employing a pair of sliding covers. Here, the internal compartment 124 is covered by two surfaces 126 which are slidably interconnected to the table. To achieve this, mating channels 128 are formed at opposite sides of the compartment. The surfaces 126 can be slid relative to one another to gain access to the internal compartment 124. FIG. 16 illustrates a related embodiment wherein table tops 144 are permitted to slide over one another. Through the embodiment of FIG. 16, a user can slide one table top under the adjacent table top and use the resulting surface as a work surface.

Figure 12:
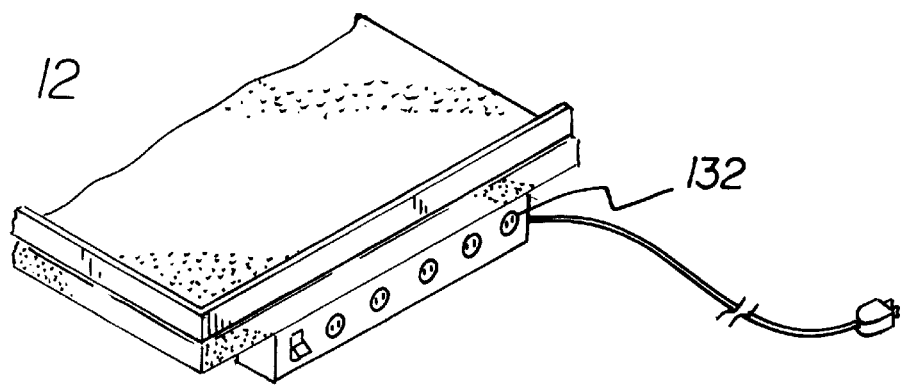
FIG. 12 is a view of a power strip incorporated into the cart of the present invention.
Figure 13:
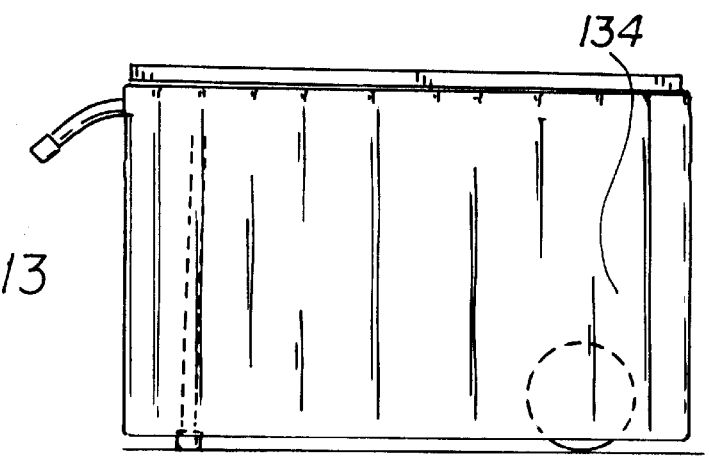
FIG. 13 is a view of a privacy curtain incorporated into the cart of the present invention.
Figure 14:
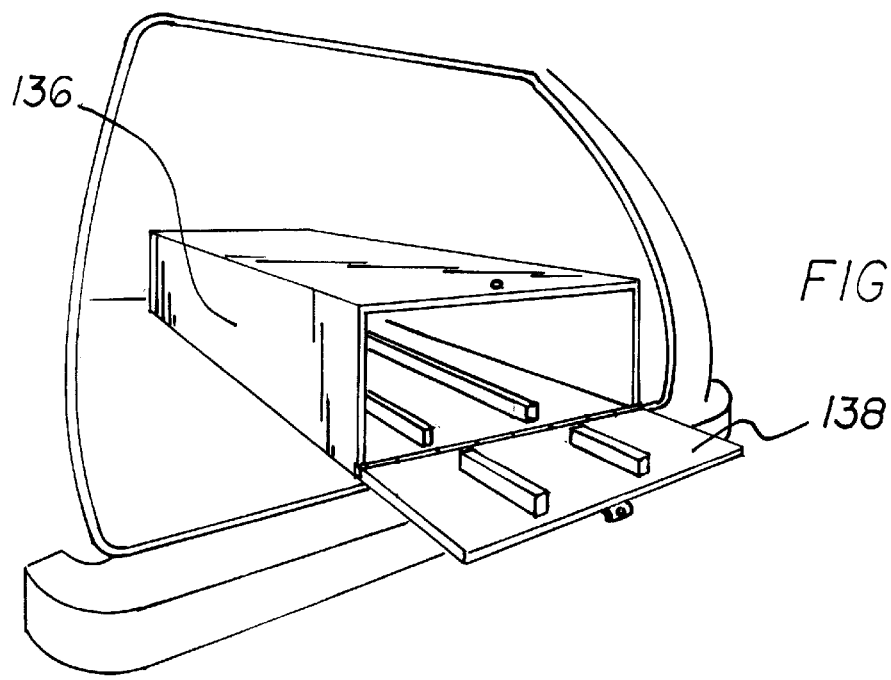
FIG. 14 is a view of an enclosed base for use in conjunction with the cart system of the present invention.

FIGS. 12–14 illustrate various additional features which can be employed with any of the cart embodiments described hereinabove. FIG. 12 illustrates a power strip 132 which can be integrated with the table top. Such power strip 132 allows multiple pieces of equipment to be powered from one electrical socket. FIG. 13 illustrates a privacy curtain 134 which may be deployed about the periphery of the table. The curtain 134 thus functions in covering the various linkages. This embodiment is specifically for use in staging demonstrations with the system of the present invention. The curtain 134 is secured to the periphery of the table via Velcro™ fasteners. FIG. 14 illustrates an enclosed base embodiment 136. This base 136 functions the same as the base previously described. However, the base of FIG. 14 is enclosed and includes a pivotal door 138. This embodiment prevents the cart from being damaged during transport and, by locking, provides security.

This detailed description has been provided only for illustrative purposes. It is recognized that other embodiments may be articulated without departing from the objects and scope of the present invention. Any such modifications and variations are meant to be within the scope of the invention as contained within the following claims.

What is claimed as being new and desired to be protected by Letters Patent of the United States is as follows:

1. A convertible hand cart system adapted to be positioned within the rear compartment of a vehicle, the system comprising:

a table having an upper surface, a lower surface and a peripheral edge therebetween, a forward portion and a rearward portion, a stop secured to the forward lower surface, padding covering the entire table, three raised edges positioned about the peripheral edge, a c-clamp having an upper portion secured to the lower forward portion of the table and a lower opened portion;

a pair of primary linkages having a first end pivotally coupled to the rearward lower surface of the table, and a second end in between which a transverse rod is secured, the transverse rod adapted to be removably coupled to the c-clamp when the primary linkages is in the folded orientation;

a pair of transverse linkages having a rearward curved handle extent and a forward extent, a pair of wheels rotatably mounted to the forward extent, the pair of transverse linkages being pivotally interconnected proximate the first end of the pair of primary linkages;

an elbow linkage interconnected between the first end of the pair of primary linkages and the rearward extent of the pair of transverse linkages, the elbow linkage having a first locked orientation wherein the pair of transverse and primary linkages are separated, and a second orientation wherein the linkages are permitted to pivot relative to one another;

a pair of free linkages having a first end pivotally coupled to an intermediate extent of the pair of transverse linkages, and a second end, the pair of free linkages having a first folded orientation wherein the linkages are in alignment with the primary and transverse linkages and the table, and a second erect orientation wherein the pair of primary linkages are inclined relative to the table and the second end is in frictional engagement with the forward lower surface of the table and the stop;

the table being in an upright configuration with the pair of elbow linkages in the first locked orientation and the pair of free linkages being in the second erect orientation, the table being in a collapsed folded configuration with primary, transverse and free linkages folded upon the lower surface of the table;

a base positioned within the rear compartment of the vehicle, the base having an upper surface with twin rails supported thereon, as well as a perpendicular abutment rail, the base adapted to support the cart in the folded configuration with the twin rails positioned in between the handles and wheels.

2. A convertible hand cart comprising:

a table having an upper surface, a lower surface and a peripheral edge therebetween, a forward portion and a rearward portion;

a pair of primary linkages having a first end pivotally coupled to the rearward lower surface of the table;

a pair of transverse linkages having a rearward handle extent and a forward extent, a pair of wheels rotatably mounted to the forward extent, the pair of transverse linkages being pivotally interconnected proximate the first end of the pair of primary linkages;

a pair of free linkages having a first end pivotally coupled to an intermediate extent of the pair of transverse linkages, and a second end, the pair of free linkages having a first folded orientation wherein the linkages are in alignment with the primary and transverse linkages and the table, and a second erect orientation wherein the pair of primary linkages are inclined relative to the table and the second end is in frictional engagement with the forward lower surface of the table.

3. The convertible hand cart as described in claim 2 wherein:

the table defines an internal compartment, and wherein the upper surface is pivotally interconnected to the lower surface and has a first orientation parallel to the lower surface and a second orientation inclined relative to the lower surface, and wherein the upper surface has a series of extensions pivotally interconnected thereto such that the upper surface has a first orientation wherein the extensions are folded upon upper surface and a second orientation wherein the extensions are folded outwardly of and parallel to the upper surface.

4. The convertible hand cart as described in claim 2 wherein:

the table defines an internal compartment with a series of subcompartments defined therein, and wherein the upper surface is pivotally interconnected to the lower surface and has a first orientation parallel to the lower surface and a second orientation inclined relative to the lower surface.

5. The convertible hand cart as described in claim 2 wherein:

the table defines an internal compartment, and wherein the upper surface of the table comprises two surfaces which are pivotally interconnected along an intermediate extent.

6. The convertible hand cart as described in claim 2 wherein:

the table defines an internal compartment, and wherein the upper surface of the table comprises two surfaces which are slidably interconnected to the table.

7. The convertible hand cart as described in claim 2 wherein:

the table defines an internal compartment, and wherein two sliding drawers are positioned within the compartment.

8. A system for the convenient storage, transport and loading of equipment, the system adapted to be used in conjunction with the storage area of a vehicle and the rearward area of the vehicle, the system comprising:

a hand cart having a table surface defined by upper and lower surfaces and forward and rearward extents;

a primary linkage having a first end pivotally coupled to the lower rearward table portion;

a transverse linkage having a first end pivotally coupled to the primary linkage, at least one wheel rotatably secured to a second end of the linkage;

a free linkage with a first end pivotally interconnected to an intermediate extent of the transverse linkage;

each of the linkages having a deployed orientation and a folded orientation;

a base positionable within the storage area of the vehicle, the base adapted to receive and support the hand cart with all the linkages in the folded orientation;

the vehicle adapted to support the hand cart with all the linkages in the folded orientation;

the cart adapted to be transported by the wheel with all the linkages in the folded orientation;

the cart adapted to obtain an inclined table configuration by deploying only the primary linkage;

the table obtaining an erect table configuration by deploying all the linkages.

* * * * *